Oct. 1, 1968     H. E. MATHES     3,403,840

OPENING DEVICE FOR PACKAGES WRAPPED WITH SHRINKABLE PLASTIC FILMS

Filed Nov. 3, 1965

INVENTOR.
Howard Eugene Mathes

BY *Fredrick H. Braun*

ATTORNEY

United States Patent Office 3,403,840
Patented Oct. 1, 1968

3,403,840
OPENING DEVICE FOR PACKAGES WRAPPED WITH SHRINKABLE PLASTIC FILMS
Howard Eugene Mathes, Harlan Township, Warren County, Ohio, assignor to The Procter & Gamble Company, Cincinnati, Ohio, a corporation of Ohio
Filed Nov. 3, 1965, Ser. No. 506,157
10 Claims. (Cl. 229—51)

ABSTRACT OF THE DISCLOSURE

An opening device for packages wrapped with heat shrinkable plastic films. The longitudinal edges of the films are lapped and sealed to form a longitudinal seam. The film is cut transversely through the longitudinal seam to form an opening tab. When pulled, the opening tab causes tearing of the wrapper along the edges of the longitudinal seam.

---

This invention is in the field of packaging and more particularly it relates to the provision of an opening device for a package overwrapped with a shrinkable plastic film in order to facilitate removal of said film.

Interest in packages overwrapped with shrinkable films has grown rapidly, particularly with the advent of axially oriented films such as polyethylene, polypropylene, polyvinyl chloride, polyvinylidene chloride and other similar and equivalent biaxially oriented films. One of the outstanding features of shrinkable film overwrapping is the toughness of the package and its durability. While these physical characteristics are an asset in the handling and storage of the package, they also cause problems and difficulties in removal of the film to open the package.

Heretofore the only known opening devices for biaxially oriented shrinkable films have used a pressure sensitive tape in order to initiate tearing of an overlying cut as in U.S. Patent 3,175,752 issued to George C. Stabenow. One of the disadvantages of an opening device as described in the Stabenow patent is that when tearing is initiated by the pressure sensitive tape, the tears tend to migrate. Therefore, they will not consistently provide an elongated opening as needed for some types of overwrapped packages. This type of opening device also requires a pressure sensitive tape as a tearing tab which has the disadvantage of increasing costs due to the tape itself as well as necessitating an extra manufacturing step.

It is an object of the present invention to obviate the above difficulties.

Another object of the present invention is the provision of a simple opening device for packages overwrapped with shrinkable plastic films, the opening device being designed to consistently open the package with a minimum of effort.

Another object of the invention is the provision of an opening device which can be applied to a package overwrapped with a shrinkable plastic film at a minimum of cost since no separate tab is required nor is there any need for equipment to apply the tear tab.

A further object of the invention is the provision of an opening device for packages wrapped with shrinkable plastic films which is capable of being applied efficiently to finished packages at extremely high production speeds in the range of 300 packages per minute or more.

The nature and substance of the invention can be briefly summarized as comprising an opening device for any article which is surrounded and wrapped with a film of heat sealable thermoplastic material which is axially oriented and shrinks when subjected to heat. Two longitudinal edges of the wrapping material are overlapped and heat sealed to form a longitudinal seam in the film. The longitudinal seam is transversely slit by cutting or burning a U-shaped, V-shaped or arcuate slit. The ends of the slit terminate beyond the edges of the longitudinal seam to form an opening tab. On pulling the tab the wrapping material is torn on either side of the seam which acts as a guide to prevent the tears from migrating and merging thus permitting the formation of a long narrow opening in the wrapping material for the entire length of the longitudinal seam to readily facilitate removal of the wrapper in order to gain access to the packaged article.

The films which can be used in the present invention are any of those comprising one or more synthetic, organic thermoplastic polymers as long as they are orientable. Generally useful polymers are orientable polymers of olefins, e.g., monomers having the formula:

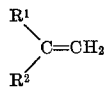

wherein $R^1$ is hydrogen or a halogen and $R^2$ is hydrogen, a halogen, or a hydrocarbon group such as an alkyl group or an aryl group, particularly those having from 1 to 8 carbon atoms, and copolymers thereof with one or more other compounds copolymerizable therewith which contain polymer producing unsaturation such as is present for example in carbon monoxide and in organic compounds containing the linkage $>C=C<$, e.g., styrene, vinyl stearate, butene, vinyl acetate, vinyl formate, methyl methacrylate, monobutyl maleate, 2-ethyl hexyl acrylate, N-methyl-N-vinyl acetamide, methacrylic acid, ethyl acrylate, acrylic acid, isoprene, butadiene, acrylamide, vinyl triethoxsilane, bicycloheptene, bicycloheptadiene, divinyl phosphonate and the like as well as other types of polymers including polycarbonates and condensation products of equimolar amounts of dihydric phenols and mono and/or diepoxides, the polyhydroxyethers.

The term "shrinkable" as used herein refers to a property of a film by which it contracts in length and/or width, for example, upon exposure to sufficient heat. Shrinking is generally attributable to a reorientation of molecules which were previously oriented by stretching film either uniaxially longitudinally (machine direction) or horizontally (transverse direction) or biaxially (both directions). The amount of shrinkability in the film is not critical. Obviously, the greater the shrinkability of the film the less taut the thermoplastic film must be pulled over the article to be wrapped and the farther from the edges of the article the seals can be. The absence of criticality in these operations effects great cost savings.

While the specification concludes with claims particularly pointing out and distinctly claiming the subject matter regarded as forming the present invention, it is believed the invention will be better understood from the following description taken in connection with the accompanying drawing in which:

Figure 1:
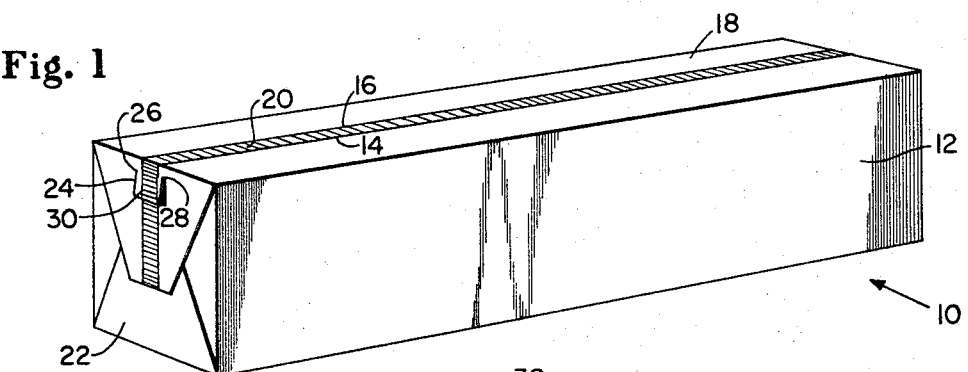
FIGURE 1 is a perspective view of a wrapped article showing one embodiment of the opening device of the invention.

Referring now to the drawings and particularly FIGURE 1, a package shown generally at 10 is wrapped with an axially oriented shrinkable film 12 which in a preferred form of the invention is biaxially oriented heat shrinkable polypropylene. The film is wrapped around the package so that the edges 14 and 16 overlap on the surface 18. The overlapped portion is preferably heat sealed to form a longitudinal seam 20. The film 12 at the end 22 of the package is thereafter folded, tucked and sealed to complete one end of the package as shown. The other end is similarly folded, tucked and sealed.

The heat of the heat sealer will cause some shrinkage of the film about the package. The major part of the film shrinkage may be produced by any desired means such as brief exposure to heated air, as in an oven or by blowers or by dipping into a heated liquid such as boiling water. The shrinkage produces a tight, strong overwrap for the package. The shrinking of these types of films is well known in the art and is discussed in U.S. Patent 2,477,614 issued to C. R. Irons.

The film can have a preformed configuration. The wrapping operation can thus consist of merely inserting the package into a bag-like member.

The opening device is formed in the film, as shown in FIGURE 1, by making a substantially U-shaped slit 24 in the film. The slit may be formed by means of a cutting knife or it can be burned in the film by means of a heated bar or wire. Any other suitable means can be used to form the slit by cutting or burning through film. While the shape of the slit is not critical, the slit must sever the longitudinal seam 20 transversely so that the ends 26 and 28 of the slit 24 lie on opposite sides of, and slightly beyond, the seam 20. This forms an opening tab 30. The slit can be made on the film-wrapped package either before or after completion of the desired shrinkage, preferably after.

Figure 2:
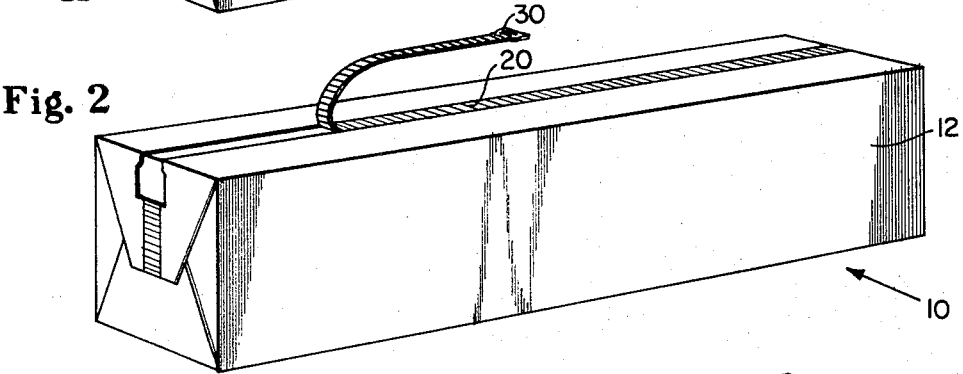
FIGURE 2 is a perspective view similar to FIGURE 1 in which the opening device is shown partially torn to initiate opening and removal of the wrapper.

In the present invention the package is readily opened as seen in FIGURE 2, by merely grasping and pulling the tab 30. This initiates tearing on either side of the longitudinal seam 20 so that the film 12 can be completely separated for its entire length. An important aspect of the present invention is that the longitudinal seam 20 prevents migration of the tears so that the length of opening is positively controlled.

It has been found that the mere addition of the slit 24 to form the opening tab 30 without the use of any protective device such as pressure sensitive tape is useful in practicing the invention to obtain satisfactory results. A package so formed can be readily handled and shipped in commercial channels without being torn or accidentally opening unless a deliberate attempt is made to grasp and pull on the tab 30.

Figure 3:
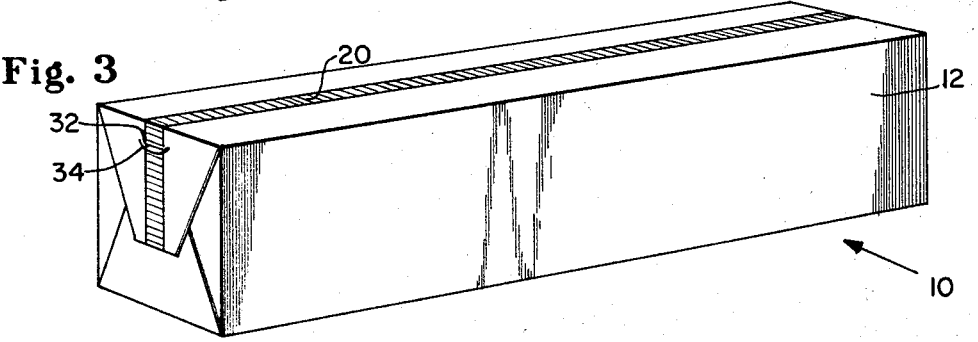
FIGURES 3 and 4 illustrate modified forms of the invention in which alternate configurations of the opening tab are shown which can be used to practice the present invention.
Figure 4:
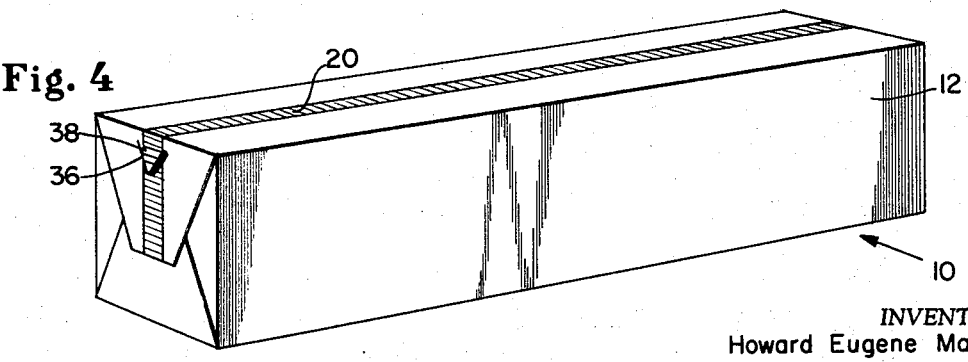

FIGURE 3 illustrates an alternate embodiment in which the opening tab 32 is formed by making an arcuate slit 34 although the manner and method of making the slit can be very much like that in FIGURE 1. Similarly, a V-shaped slit 36 is provided in the embodiment of FIGURE 4 to form an opening tab 38. The manner of opening the packages of FIGURES 3 and 4 would be identical to that of FIGURES 1 and 2. It will be noted in these alternate embodiments, that the requirement for cutting or burning transversely through the seam 20 has been met as well as the need for having the ends of the slit terminate beyond the edges of the longitudinal seam 20. Thus the shape of the slit is not critical, the only limitation being that the ends of the slit are non-linear to define an opening tab. In other words, a straight line slit transversely through the seam 20 would not be effective as a satisfactory opening device since it would not form an opening tab and would be difficult to grasp. It is also doubtful that a straight line slit would initiate parallel tearing alongside the seam on a reliable and consistent basis.

In addition to the polypropylene film described above, other specific examples of suitable wrapping material for the practice of this invention include polyethylene, poly(vinyl chloride) and poly(vinylidene chloride).

Preferably seam 20 ranges from 1/8" to 3/4" in width to provide a tearing of sufficient width to be maintained along the full length of the package, but not so wide as to be awkward.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. An opening device for an article which is wrapped with a single layer of a relatively thin and flexible sheet of thermoplastic, heat-sealable wrapping material which is shrinkable when subjected to heat, said wrapping material having two longitudinal edges overlapped and sealed to form a two layer longitudinal seam in the package, a slit through said wrapping material transversely through said longitudinal seam, the ends of the slit terminating beyond the edges of the longitudinal seam, the ends of the slit being non-linear to define an integral opening tab between its ends whereby pulling on said opening tab will cause tearing of said wrapping material on either side of said longitudinal seam to remove said wrapping material from said article.

2. An opening device as claimed in claim 1 wherein the slit is U-shaped.

3. An opening device as claimed in claim 1 wherein the slit is arcuate shaped.

4. An opening device as claimed in claim 1 wherein the slit is V-shaped.

5. An opening device as claimed in claim 1 wherein the wrapping material is biaxially oriented heat-shrinkable polypropylene.

6. An opening device as claimed in claim 5 wherein the opening device is U-shaped.

7. A method of forming an opening device for an article which is wrapped with a single layer of a relatively thin and flexible sheet of thermoplastic, heat-sealable wrapping material having two longitudinal edges, said wrapping material being shrinkable when subjected to heat comprising the steps of wrapping said article and simultaneously overlapping said longitudinal edges of said wrapping material, sealing said overlapped edges to form a two layer longitudinal seam, heating said package to shrink said film snugly around said package, forming a slit transversely through said longitudinal seam so that the ends of the slit are non-linear and terminate beyond the edges of the longitudinal seam to define an integral opening tab.

8. A method as claimed in claim 7 including the step of burning a slit in said wrapping material by means of a heated wire to form said slit transversely across said longitudinal seam.

9. A method as claimed in claim 7 including the step of cutting a slit in said wrapping material by means of a cutting knife to form said slit transversely across said longitudinal seam.

10. A method as claimed in claim 7 wherein the sequence of forming the opening device includes the step of forming a slit and thereafter heating said package to shrink said film.

References Cited

UNITED STATES PATENTS

| 2,833,404 | 5/1958 | Jacob et al. | 206—65 |
|---|---|---|---|
| 2,973,087 | 2/1961 | Rohdin | 229—51 |
| 3,175,752 | 3/1965 | Stabenow | 229—51 |
| 3,261,538 | 7/1966 | Jones et al. | 229—51 |
| 3,273,302 | 9/1966 | Walter | 229—51 |

FOREIGN PATENTS 458,375    4/1936    Great Britain.

DAVID M. BOCKENEK, *Primary Examiner.*